(No Model.)
L. BAUMEISTER.
GAS REGULATOR.
No. 282,150. Patented July 31, 1883.
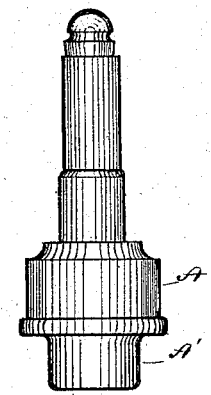
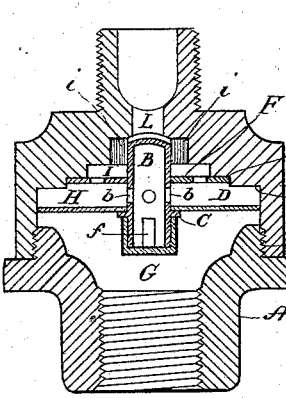
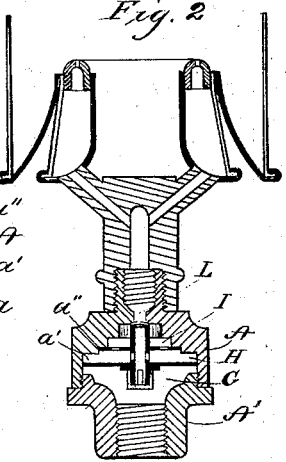
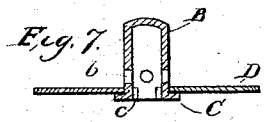
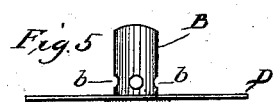
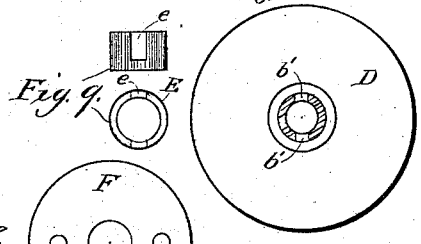
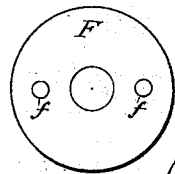
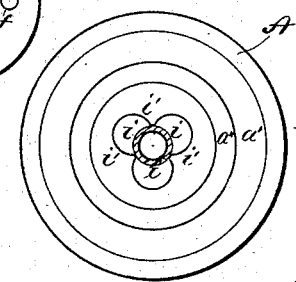
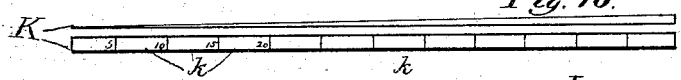
Witnesses.
W. T. Haviland
P. W. Smith
Inventor:
Leopold Baumeister
By Attys:
Wooster & Smith

UNITED STATES PATENT OFFICE.

LEOPOLD BAUMEISTER, OF BRIDGEPORT, CONNECTICUT, ASSIGNOR TO L. BAUMEISTER & CO., OF SAME PLACE.

GAS-REGULATOR.

SPECIFICATION forming part of Letters Patent No. 282,150, dated July 31, 1883.

Application filed April 11, 1883. (No model.)

*To all whom it may concern:*

Be it known that I, LEOPOLD BAUMEISTER, a citizen of the Grand Duchy of Baden, residing at Bridgeport, in the county of Fairfield and State of Connecticut, have invented certain new and useful Improvements in Gas-Regulators; and I do hereby declare the following to be a full, clear, and exact description of the invention, such as will enable others skilled in the art to which it appertains to make and use the same.

My invention relates to the regulation of gas, and has for its object to reduce the consumption in private houses, churches, theaters, &c., and also in street-lamps and other single burners.

As is well known, in ordinary gas-burners a large quantity of the gas passing through is wasted. This is notably true when the pressure is strong, at which time more gas passes through than can possibly be consumed. The unconsumed and partially-consumed gas passes out into the air of the room, which it quickly renders unfit for breathing, while it does not increase the intensity of the light, but renders it flickering and uncertain, and at the same time increases the gas-bills, as the full amount passing through the meter is sure to be registered. It is impossible by any means now in use to regulate the pressure of the gas at the burners so that a uniform flow is at all times secured. The pressure of the wind on the gasometer, the quantity of gas therein contained, and several other elements of uncertainty, all act to make the pressure at the burners exceedingly variable. I overcome these difficulties by means of a regulator, which is adapted for use in connection with single burners, or may be used in the main pipe of a building, where it will regulate the quantity of gas passing to all the burners. It may be placed either side of the meter, but is preferably placed between the meter and the burners.

For the purpose of enabling those skilled in the art to which my invention relates to make and use my improved regulator, I will proceed to describe the same, referring by letters to the accompanying drawings, forming part of this specification, in which—

Figure 1 is an elevation of a gas-burner constructed to contain my improved regulator. Fig. 2 is a sectional view of an Argand burner with my regulator applied. Fig. 3 is a sectional view of a large regulator for the main pipe of a building. Fig. 4 is a plan view, looking up, of the case with the internal parts removed. Fig. 5 is an elevation of the shell and swimmer, and Fig. 6 is a plan view of the same. Fig. 7 is a sectional view of a modified form of shell and swimmer. Fig. 8 is a plan view of the plate separating the second and third chambers. Fig. 9 represents side and end views of the cap, and Fig. 10 represents side and end views of the regulating-scale.

Similar letters indicate like parts in all the figures of the drawings.

A A' are the two parts of the case, screwed together at $a$. Part A' is internally screw-threaded, to accommodate the main pipe, and part A is externally screw-threaded, for the attachment of a distributing-pipe or a burner, as in Figs. 1 and 2.

The operating mechanism consists of four parts only, and is all located in the interior of the case. This open space, in the interior, is divided, as will presently be described, into three separate chambers, G, H, and I, through which the gas must pass to reach the burners.

B is a tube or shell closed at its upper end, and having perforations $b\ b$ about midway of its length. Below these perforations is a flange, C, upon which rests and to which is soldered or otherwise attached a thin metal plate or swimmer, D. This plate is nearly the full size of the interior of the case, and slides freely and without friction therein. Chambers G and H are separated by this swimmer. The tube or shell projects down below the swimmer, and is provided with slots or openings $b'\ b'$ in the edge thereof. This downward-projecting portion of the tube is covered by a tightly-fitting cap or cover, E, which is provided with slots or openings $e\ e$ in its edge corresponding in size and location with slots $b'\ b'$ in the tube, for a purpose presently to be explained.

Half an inch (more or less) above the swimmer, and resting in a step-like jog in the interior of the case, is a stationary plate, F, having perforations $f\ f$, and another central perforation just large enough to allow shell B to work therein. Plate F separates chambers H and I. The particular shape of this portion of the case is not a matter of vital importance; but the form shown is deemed preferable.

The movement of the swimmer is limited in one direction by part A' of the case, which screws into part A, and in the other direction by a shoulder, a', the interior diameter of the case being lessened to form said shoulder. A short distance above is another shoulder, a'', against which plate F rests, said plate being designed to tightly fit the lessened diameter at that point and form an immovable partition between chambers H and I. The upper portion of chamber I consists of three side chambers, i i, between which are bearing-points i' i', (see Fig. 4,) which support the upper end of the shell, but reduce the friction to the minimum.

It should be observed that there is no friction between the swimmer and the case; but the swimmer is rigidly attached to the shell, which bears only in the aperture in plate F and on the bearing-points i' i'. This double central support of the swimmer is an important feature of my invention, as it renders cramping or buckling impossible.

My object in closing the top of the shell and causing the gas to pass out through apertures in the side of the shell is to prevent the whistling which must inevitably result from allowing the gas to escape over the end of the shell or tube, particularly when the pressure is strong and the shell is forced close up against the end of the case.

The upper end of the shell is made to correspond in shape with the orifice leading out of chamber I.

The operation is as follows: The gas first enters chamber G and passes through slots e in cap E, and through the corresponding slots b' into shell B. It then passes through openings b into chamber H, and from this chamber through apertures f f in plate F into chamber I, and then to the burners. It follows, of course, that in use all of the chambers are constantly filled with gas. K, Fig. 10, is a tapering bar of metal, which I use to regulate the quantity of gas allowed to go to the burners. It is provided with a scale, k, and for single burners is so graduated as to allow from one to ten feet of gas per hour to pass. Where a large regulator is used in a main pipe, a larger scale, of course, is used; but the regulation may be made as accurate as in a single burner. Parts A and A' of the case being separated, cap E is placed over the lower end of shell B. To adjust the regulator for the consumption of a certain number of feet per hour, the regulator is pushed through slots e and b' until the proper mark is reached. The cap is then turned against it. This will allow only the desired amount of gas to enter the shell. Should more gas be required, it is only necessary to separate the parts of the case, and, with the regulator, enlarge the aperture at slots e and b', so as to admit as many feet per hour as it is desired to burn. Whenever the pressure is increased the force is exerted against the swimmer, and both swimmer and shell are raised more or less, and although the gas may temporarily be forced more rapidly through the apertures and into the shell, the raising of the shell with the swimmer checks the outflow at outlet L. In the shell the increased flow is partially checked by apertures b b, leading into chamber H, where it is again checked, as it can only enter chamber I through apertures f f. The raising of the swimmer for the instant forces some of the gas out of chamber H into chamber I, but at the same time the swimmer is raised the shell goes with it and checks the outflow at L, and consequently at the same time checks the outflow from chamber H to chamber I. At the instant that the outflow from the upper chambers is checked the elasticity of the gas in chamber H will force the swimmer and shell downward, which will increase the outflow at L, thus instantly restoring the equilibrium and balancing the pressure in chambers G and H. Having once adjusted the cap to permit the consumption of a certain number of feet per hour, no matter how much in excess of that amount the actual pressure may be, the amount of gas consumed will not vary perceptibly.

I have demonstrated by actual experiment that in a burner regulated to burn ten feet per hour any available increase of pressure will not vary the consumption more than one foot per hour. In use the swimmer is never still an instant, but vibrates backward and forward, the slightest increase of pressure forcing it forward and slightly compressing the gas in chamber H, which acts as a cushion and again forces it backward.

The advantages demonstrated by actual experiment to result from the use of my regulator are, that from ten to thirty per cent. of gas is saved at every burner, smoking and flickering are prevented, also the breaking of chimneys of Argand burners, the flame being always steady and the heat regular. No mechanical skill is required to operate it, and there are no parts that can wear out. When the gas reaches the burners, there is no unnecessary pressure, as it has been controlled by the regulator. The gas, therefore, has plenty of time to freely mix with the air. This produces a steady and clear white flame. With the ordinary burners, when the pressure is increased, a large blue field appears in the center of the flame, and although the consumption of gas is increased ten to thirty per cent., the intensity of the light is diminished.

In Fig. 7, I have shown a modified form of shell, which is not extended below flange C, no cap being used. Instead of the cap, a ring or block, c, is used, which is inserted in the lower end of the shell. This ring is provided with an opening of sufficient size to allow a certain predetermined number of feet per hour to enter the shell. In this form the regulation of the pressure is effected in the same manner as in the form above described, but is incapable of adjustment to consume different quantities per hour, as in the preferred form.

Having thus described my invention, what I claim as new, and desire to secure by Letters Patent, is—

1. A regulator having chambers, as shown, a shell closed at its upper end, and a swimmer rigidly attached thereto, the shell having apertures to allow the passage of gas.

2. In a regulator, a centrally-supported shell and a swimmer attached thereto, in combination with plate F, having apertures $ff$, and bearings $i'$, substantially as described.

3. Case A A', swimmer D, and shell B, projecting below said swimmer, and having slots $b'$, in combination with cap E, having slots $e$.

4. In a gas-regulator, shell B, having slots $b'$, and cap E, having slots $e$, adapted for use in connection with a regulating-bar having a scale, as shown.

5. In a gas-regulator, case A A', having shoulders $a'$ $a''$, and bearing-points $i'$, in combination with plate F, shell B, and swimmer D.

6. In a gas-regulator, shell B, having apertures $b$, and swimmer D, in combination with plate F, having apertures $f$, substantially as described.

7. Shell B, closed at its upper end, and having apertures $b$ $b'$, and swimmer D, in combination with chambers $i$ $i$ and outlet L, for the purposes set forth.

In testimony whereof I affix my signature in presence of two witnesses.

LEOPOLD BAUMEISTER.

Witnesses:
F. W. SMITH,
S. S. WILLIAMSON.